United States Patent [19]
Shiobara

[11] Patent Number: 5,353,284
[45] Date of Patent: Oct. 4, 1994

[54] DATA TRANSMISSION SYSTEM
[75] Inventor: Yasuhisa Shiobara, Tokyo, Japan
[73] Assignee: Kabushiki Kaisha Toshiba, Kawasaki, Japan
[21] Appl. No.: 973,916
[22] Filed: Nov. 12, 1992
[30] Foreign Application Priority Data
   Nov. 12, 1991 [JP] Japan ................... 3-295734
[51] Int. Cl.⁵ ................... H04L 12/40; H04J 3/26
[52] U.S. Cl. ................... 370/85.1; 370/85.2; 370/85.15
[58] Field of Search ............... 370/85.1, 85.2, 85.3, 370/85.4, 85.5, 85.6, 85.15, 94.1, 94.2; 340/825.5, 825.51, 825.05

[56] References Cited
U.S. PATENT DOCUMENTS

| | | | |
|---|---|---|---|
| 4,727,538 | 2/1988 | Furchgott et al. | 370/85.1 |
| 4,730,308 | 3/1988 | Friedman et al. | 370/85.1 |
| 4,998,245 | 3/1991 | Tanaka et al. | 370/85.1 |
| 5,111,452 | 5/1992 | Kyuma | 370/85.1 |

Primary Examiner—Wellington Chin
Attorney, Agent, or Firm—Foley & Lardner

[57] ABSTRACT

A data transmission system has multiple nodes connected to a common transmission medium. Each of the multiple nodes transmits data and the other nodes receive and store the data through the common transmission medium. The received data is read out for information exchange among the nodes. The node has transceiver circuitry for receiving a data frame and transmitting the data frame, receive and transmission control circuitry, receive data frame transmission control circuitry, a receive buffer, an external interface and address conversion memory circuitry. The receive and transmission control circuitry receives a data frame from the transceiver, detects whether or not the data frame designates that node and is received without errors, and transmits a data frame reception start signal and a data frame reception end signal. The data frame transmission control circuitry extracts predetermined received data included in the received data frame in response to the data frame reception start signal, and transmits the predetermined received data in response to the data frame reception end signal. The receive buffer receives and stores the predetermined received data, and the external interface provides a specific address. The address conversion memory circuitry stores an address of the received data stored in the receive buffer and converts the specific address into the address of the received data, thereby generating a conversion address. This considerably shortens the time required to transmit the received data, and improves data transmission speed in the whole system.

10 Claims, 8 Drawing Sheets

| ADRS1 | A | |
|---|---|---|
| ADRS2 | B | ~89 |
| ∘ | | |
| ∘ | | |
| ∘ | | |
| ∘ | | |
| ∘ | | |
| ∘ | | |
| ADRS256 | XYZ | |

DATA TRANSMISSION SYSTEM

This application is related to U.S. application Ser. No. 08/144,491, which is a continuation of U.S. application Ser. No. 07/653,290, filed Feb. 11, 1991, now abandoned, which is incorporated herein by reference.

BACKGROUND OF THE INVENTION

1. Field of the Invention

The invention relates to a data transmission system in which computers or various control apparatus distributed in different locations are mutually connected by a common transmission medium for mutual data exchange, such as in a network of computers or automated machine controllers.

2. Description of the Related Art

Recent developments in factory automation have resulted in the construction of high-function, high-performance continuous process control systems. In such systems intelligent machines, such as computers, PCs (Programmable Controllers), and DCS (Distributed Control Systems), are connected to a common transmission medium to build a network. Such a networked system can exchange information, including production information (for example, manufacturing entry and product result), manufacturing program data and process control data. Moreover, such networked systems can monitor data among these multiple machines and execute decentralized control and supervisory control of the entire system. One type of continuous process control system shares supervisory data and control data which are to be exchanged among multiple machines, thus ensuring efficient decentralized control in individual machines and supervisory control of the entire system.

In a point-to-point type data transmission system employed for information exchange among individual machines, each machine transmits information to a specifically identified machine (the destination) and awaits acknowledgement of the reception of the information from that destination. The time consumed in complicated and troublesome handshaking and other duplicative procedures in multi-point and point-to-point communications has resulted in relatively slow response times in such point-to-point data transmission systems. As a result, broadcast and multicast data transmission systems have emerged. In one example of a broadcast or multicast data transmission, each machine hooked up to the data transmission system periodically transmits its data and other machines periodically receive these incoming data, which they store internally for monitoring and controlling the application system. The monitor and control data typically is common to the entire system and is stored in a "common memory", CM, provided within each machine or node. The "common memory" in each node has the same configuration, at least for address and data purposes, to facilitate a common addressing scheme. The monitor/control data is stored in each common memory at a specific memory address common to the individual machines, thereby renewing the latest data periodically. U.S. Pat. No. 4,930,121 discloses a system having a plurality of common memories in a plurality of nodes with a common address structure. High-speed and effective information exchanges between a node and any number of destinations (multi-point type communication) are executed in this manner, to achieve decentralized control for each machine and supervisory control of the entire system. Examples of such a data transmission system are a data transmission system as disclosed in Published Examined Japanese Patent Application No. 64-8501 and a network system employing a token-passing bus system as disclosed in Published Unexamined Japanese Patent Application Nos. 1-157143, 3-45042.

Figure 1:
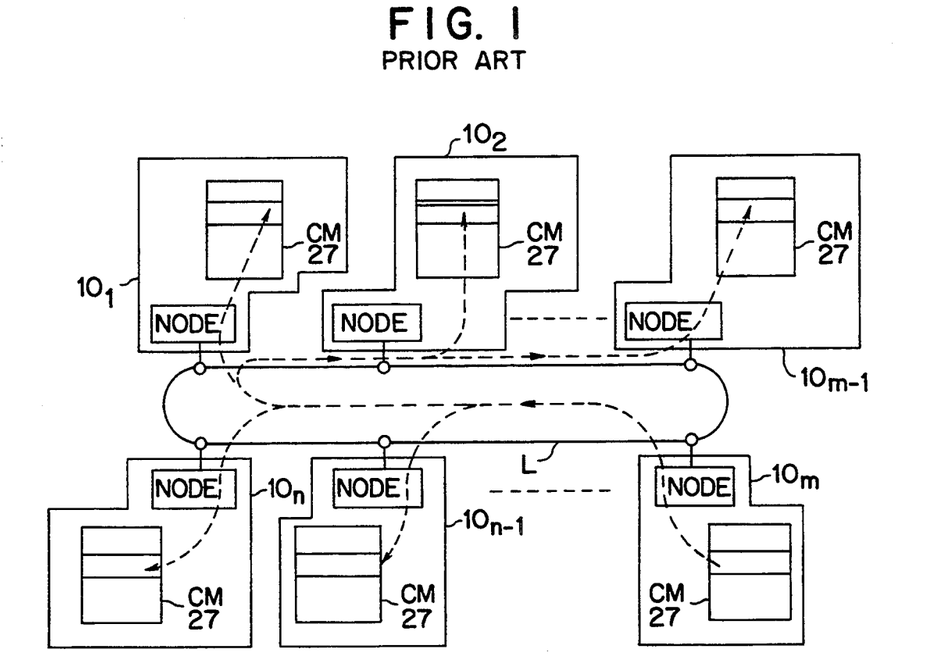
FIG. 1 is a schematic diagram illustrating the structure of a LAN system as a kind of a data transmission system.

FIG. 1 illustrates the construction of a local area network (LAN) system to be employed in a conventional continuous process control system. Multiple nodes $10_1$ to $10_n$ are connected at proper distances to a common transmission medium L. Such nodes can correspond to the above described machines. Each of the nodes $10_1$–$10_n$ has a common memory CM incorporated. Typically, the common memory in each node is substantially identical. The dashed line to each common memory CM, 27, in FIG. 1 indicates that each common memory stores the same information at the same address location. A node is authorized to use the transmission path to broadcast or multicast information within a predetermined time period. At the expiration of the predetermined time period that node gives the authorization to the next node. This is known as media access control. Although a ring network is constructed in FIG. 1, a bus network having individual nodes $10_1$–$10_n$ connected in a bus form and a star network having the nodes connected in a star form are also possible configurations.

The IEEE (Institute of Electrical & Electronics Engineers) Standard 802.5 to be applied to a loop network, the FDDI system standardized by American National Standards Institute (ANSI), and the IEEE Standard 802.4 to be employed in the bus or star network can all be applied in this type of data transmission system. All of these systems are similar or applicable to media access control via a token. In a token-passing system individual nodes exchange a frame called "token" with one another. Possession of the token gives transmission authorization to a node, so that multiple nodes do not simultaneously have the permission to transmit at the same time. Since the node receiving the token must transmit data within a predetermined time period, the total number of nodes and the selected predetermined times for the individual nodes restrict the maximum time that a node must wait to transmit its data. The predetermined time periods may be the same or different for each node. The individual nodes send data in accordance with a predetermined order in which the token is passed to allow access to the transmission path.

Figure 2:
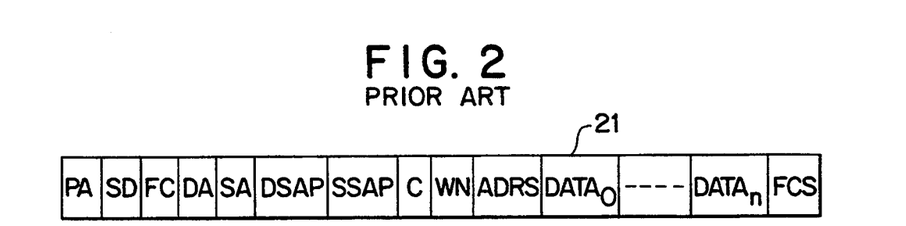
FIG. 2 is a schematic diagram illustrating the format of a data frame transmitted among nodes.

In the LAN system shown in FIG. 1, each of the nodes $10_1$ to $10_n$ broadcasts or multicasts a data frame to the other nodes. As shown in FIG. 2, the data frame includes the following fields: preamble (PA), start delimiter (SD), frame control (FC), destination address (DA), source address (SA), destination service access point (DSAP), source service access point (SSAP), information command (C), information word number (WN), address field (ADRS) output data ($DATA_0$–$DATA_n$), and frame check sequence (FCS). An end delimiter (ED) may also be used.

Figure 3:
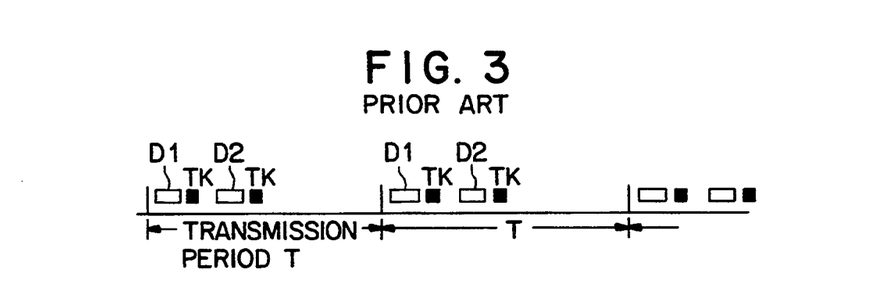
FIG. 3 is a schematic diagram illustrating a train of frames in a transmission path.

When the other nodes all receive the data frame, the data frame is stored in the common memory CM at a specific address $CM_1$. The node having authorization to use the transmission path gives the token to the next node when a predetermined time period has elapsed. The node receiving this token has the right to use the transmission path for a predetermined period of time, and likewise transmits its data frame. Thus, all the nodes $10_1$–$10_n$ contain the same contents in each common memory, CM. FIG. 3 illustrates one example of a train of frames on the transmission path, which are transmitted by the individual nodes $10_1$, $10_2$ ..., $10_n$ in the order of the data frame $D_1$, followed by the token TK, data frame $D_2$ followed by the token TK, and so forth, within a predetermined transmission period T.

Figure 4:
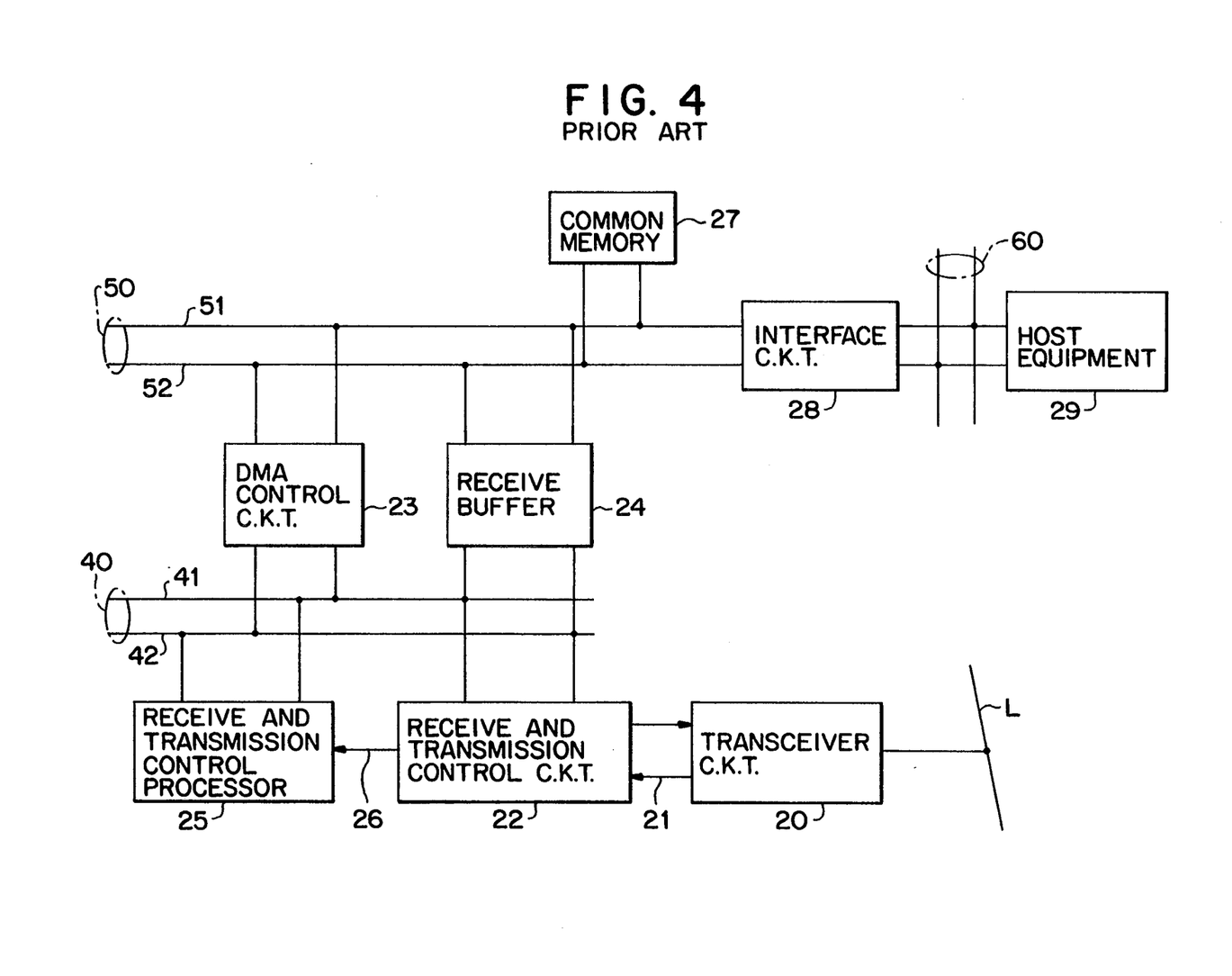
FIG. 4 is a block diagram illustrating a conventional node.

The nodes $10_1$–$10_n$ each have the hardware configuration shown in FIG. 4. When one node having the authorization to use the transmission path, for example, the node $10_1$, transmits the data frame shown in FIG. 2, each of the other nodes $10_2$–$10_n$ receives the data frame at transceiver circuit 20. Transceiver circuit 20 sends a received output 21 to receive and transmission control circuit 22. A receive and transmission control circuit 22 in each node checks the DA field in the received data frame to determine whether or not the received data is intended for that node. If an individual address designating only one node, a broadcast address or a multicast address in the DA field designates that node as an addressee, control circuit 22 determines that the received data is intended for that node and further processes the data frame. When control circuit 22 completes the reception of the data frame, a DMA (Direct Memory Access) control circuit 23 extracts the received data in the fields from the FC field to FCS field from the data frame and stores the data in a receive buffer 24.

Figure 5A:
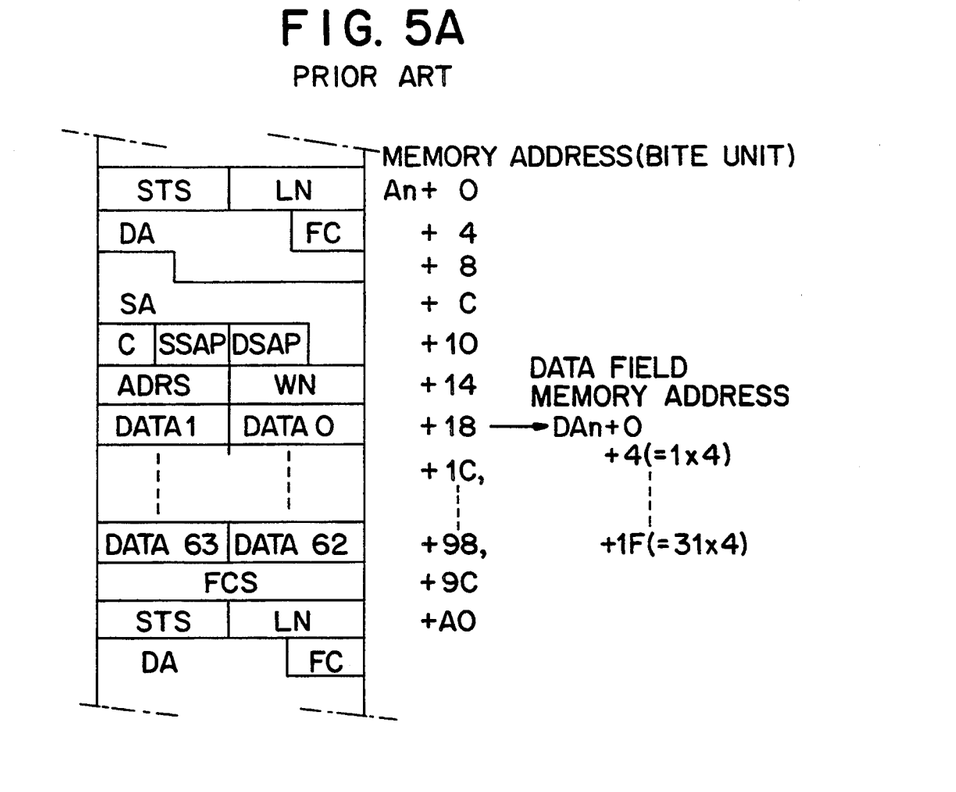
FIGS. 5A and 5B are schematic diagrams illustrating how data is stored in a receive buffer.
Figure 5B:
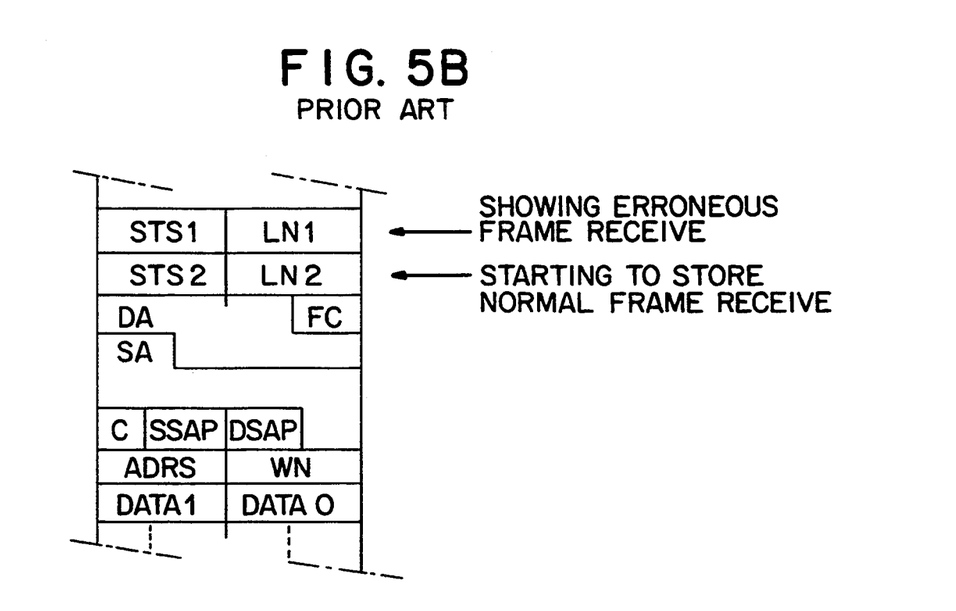

The received data is stored in the receive buffer 24, as shown in FIG. 5A or 5B. FIG. 5A illustrates one example of a storage arrangement of receive buffer 24 in the case of proper or normal data reception without error, and FIG. 5B the storage status of receive buffer 24 when there is a reception error. In either case, in this example, the field length of the received data is "64" words. In these diagrams, STS (Status) is status information which indicates whether the reception has been properly completed or a reception error has occurred (determined for example, by a cyclic redundancy check), and LN (Length Number) represents the total quantity of data stored in the receive buffer 24.

Referring again to FIG. 4, a receive and transmission control processor 25 begins to process the received data upon reception of a data frame reception end signal sent along line 26 from the receive and transmission control circuit 22. The processing of the received data in receive and transmission control processor 25 is to determine if the DSAP field, the SSAP field and the C field in the received data stored in the receive buffer 24 match predefined values. If the required matches exist, the WN field, which indicates the total quantity of data in the received data field, and the ADRS (Address) field, which indicates the start memory address to store data in the common memory 27, are read out and the WN value and ADRS value are set in the DMA control circuit 23. The DMA control circuit 23 in turn transfers the received $data_0$ to $DATA_n$ in the receive buffer 24 to the common memory 27. The data stored in the common memory 27 is read out via interface circuit 28 and utilized by host equipment 29, such as a computer, PC or DCS. After the received data is temporarily stored in receive buffer 24, the values in the WN field and ADRS field are read out and transferred to the associated address in the common memory 27.

FIG. 4 also shows buffer memory bus 40 a buffer memory data bus 41 and a buffer memory address bus 42, and a common memory bus 50 having a common memory data bus 51 and a common memory address bus 52. Host system bus 60 is also shown between interface circuit 28 and host equipment 29. A common memory bus control circuit (not shown) may also provided.

In the above described system, the receive buffer 24 and the common memory 27 are physically different from each other. Temporarily storing the data frame in the receive buffer 24 and transferring it for storage in common memory 27 results in long processing times. These processing times restrict the data transfer performance of the entire communication system. One reason for this is that host equipment 29 cannot access common memory 27 while the common memory and receive buffer 24 are exchanging data.

Even if the data transmission rate on the media could be increased to enhance performance, the processing time involved in transferring received data from the temporary storage in the receive buffer 24 to the final storage destination in common memory 27 is restricted by the data transfer performance of the common memory bus 50 between the receive buffer 24 and common memory 27. Thus, performance improvement is limited. Moreover, improving the data transmission rate to enhance the transfer performance requires complex hardware.

Related U.S. application Ser. No. 07/653,290, filed Feb. 11, 1990 attempts to eliminate the common memory by reading a start memory address from the receive buffer. An upper and lower address are then calculated and a carry acquired. The upper address is put together with a common memory address to access a lower address generating memory.

SUMMARY OF THE INVENTION

It is therefore an object of the invention to provide a data transmission system which can shorten the time to transmit data, and improve reliability of the data transmission. In particular, the invention eliminates the common memory and therefore the time required to transfer data from the receive buffer to the common memory, without the need for a lower address generating memory.

To achieve the above and other objects according to the invention, a data transmission system has multiple nodes connected to a common transmission medium. When a node transmits its data, the other nodes receive and store the data. The received data is read out for information exchange among the multiple nodes. Each node contains a transceiver connected to the common transmission medium. The transceiver receives and transmits data frames. Each node also has a receive and transmission control means, which receives the data frames, detects whether or not the data frames designate that node as an addressee and whether the data frames are received without errors. The receive and transmission control means also transmits a data frame reception start signal and a data frame reception end signal.

Each node further contains a data frame transmission control circuit. This circuit extracts predetermined received data included in the received data frames in response to a data frame reception start signal. It also transmits the predetermined received data in response to a data frame reception end signal.

Each node also includes a receive buffer, which is a memory that receives and stores the received data. An external interface provides a specific address to a node. An address conversion memory circuit stores the address of the received data stored in the receive buffer. This address conversion memory circuit also converts the specific address from the external interface into the address of the received data, thereby generating a conversion address in order to access the received data in the receive buffer. To facilitate address conversion, the address conversion memory circuit has a dual port memory, which at initialization is downloaded with addresses corresponding to the top addresses of memory blocks in the receive buffer. Monitor and control data is stored in these memory blocks, as identified in the dual port memory.

Address conversion is accomplished by dividing the receive buffer into addressable memory blocks with each address having a high portion identifying a block and a low portion identifying a specific address within the block. As data is received, it is stored in locations within the blocks using a start address as the top of an empty block and counting down a known number of words until all the words in the received data are stored. A memory, i.e., the dual port memory, stores the addresses of the tops of the blocks. To read data, an address from an external device is converted by adding the top of the block corresponding to the start address to the address from the external device, which provides the lower portion of the address. This configuration eliminates the need for a separate common memory to store the monitor and control data and allows the receive buffer to act as a virtual common memory. It is transparent to the external device, which specifies an address as though a common memory were present in the node.

BRIEF DESCRIPTION OF THE DRAWINGS

The invention is described herein with reference to the figures in which.

DETAILED DESCRIPTION OF THE PREFERRED EMBODIMENTS

Figure 6:
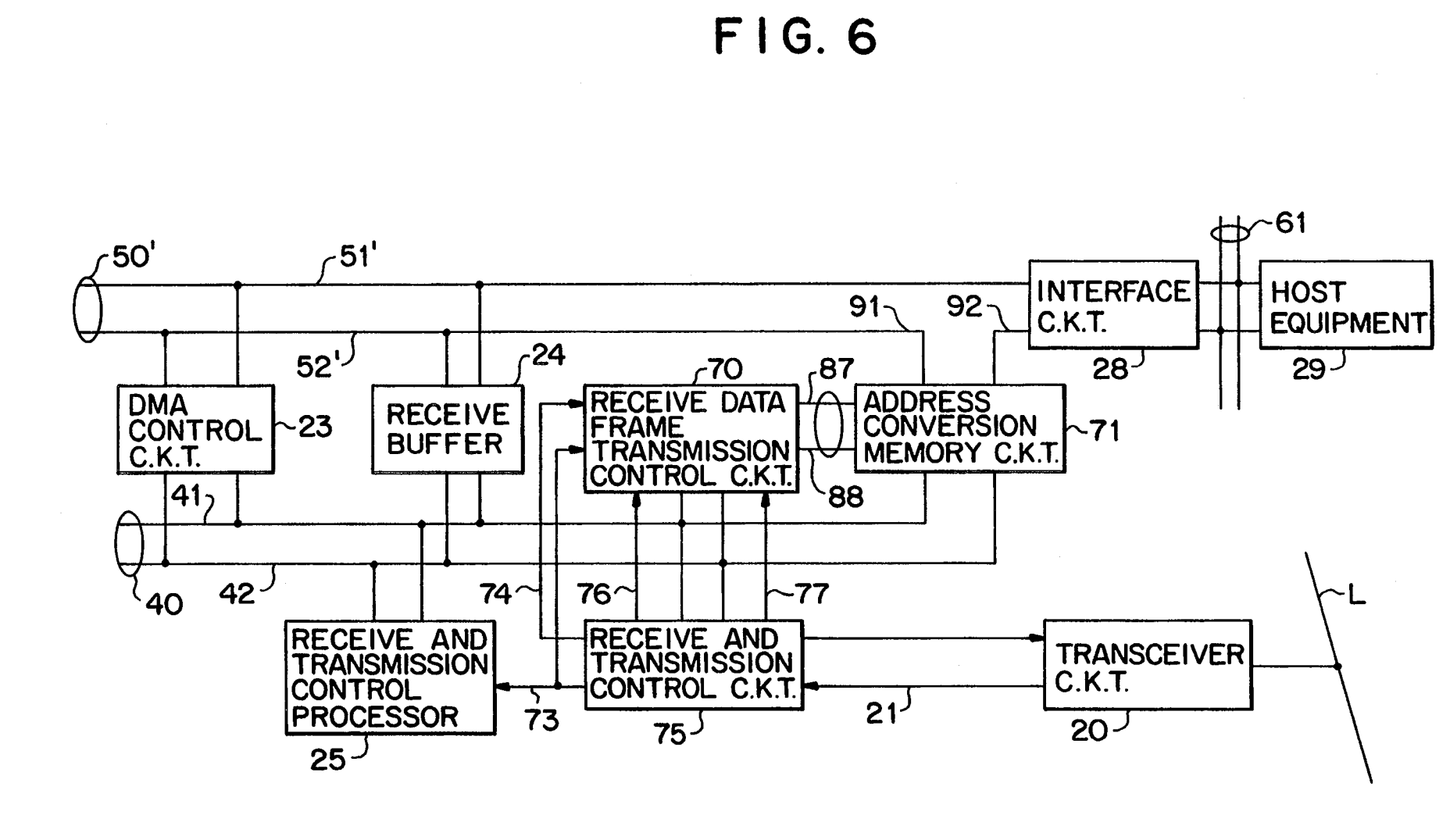
FIG. 6 is a block diagram illustrating a node according to an embodiment of the invention.

FIG. 6 shows the hardware structure of nodes in a system according to an embodiment of the invention. The sections in FIG. 6 corresponding to those in FIG. 4 are given the same reference numerals, since their detailed explanation has been previously discussed.

Each of the nodes has a transceiver circuit 20, a DMA control circuit 23, a receive buffer 24, a receive and transmission control processor 25, an interface circuit 28, a receive data frame transmission control circuit 70, an address conversion memory circuit 71 of the dual port memory type and a receive and transmission control circuit 75.

The receive buffer 24 has a number of memory blocks for storing data received in one transmission period T. Receive buffer 24 also includes at least one empty memory block and a memory capable of storing other received frames not described herein. Also included in receive buffer 24 is a buffer memory to store data which the node itself may send.

Figure 7:
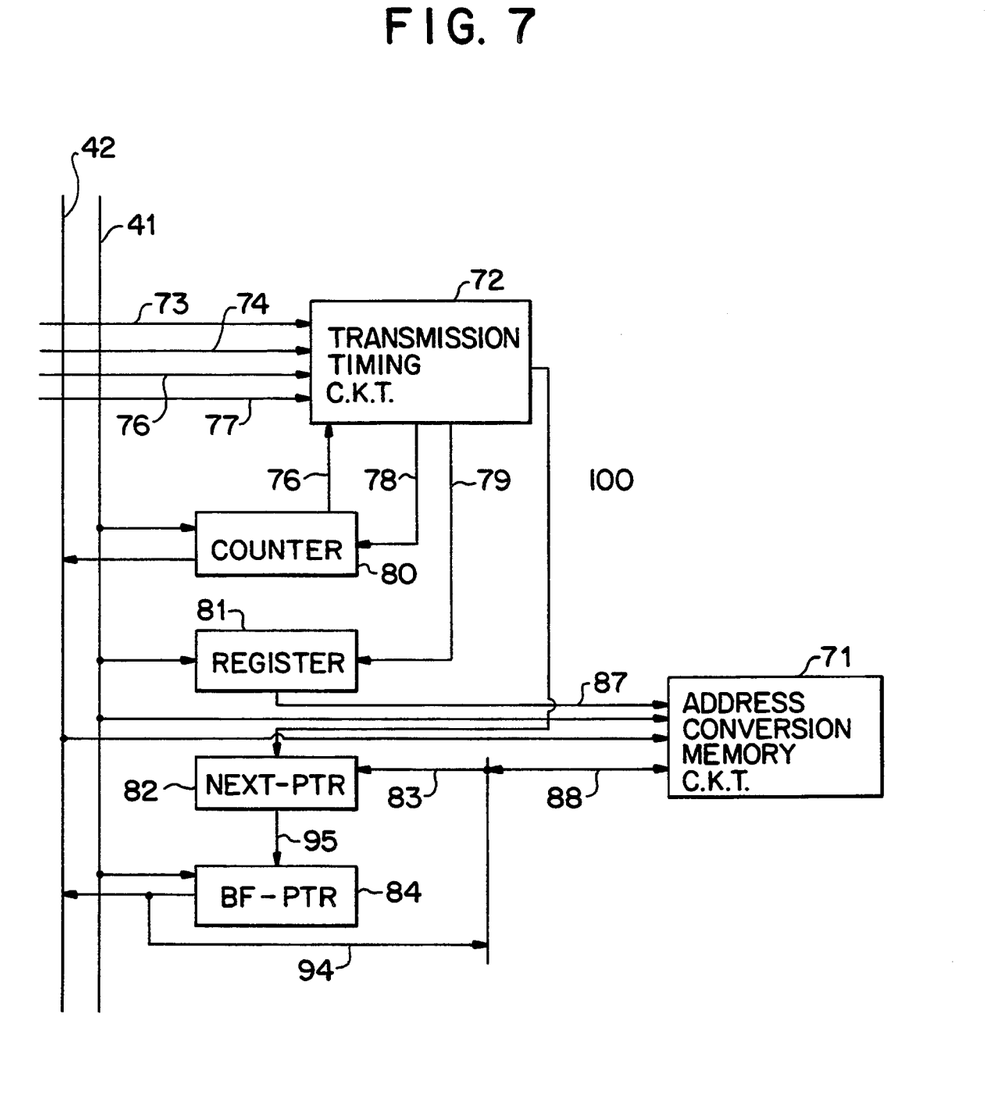
FIG. 7 is a block diagram illustrating the receive data frame transmission control circuit shown in FIG. 6.

The receive data frame transmission control circuit 70 in FIG. 7 includes a transmission timing circuit 72, a counter 80, a register 81, a next pointer NEXT-PTR 82 and a buffer pointer BF-PTR 84. Transmission timing circuit 72 receives a data frame reception end signal 73 and a data frame reception start signal 74 from receive and transmission control circuit 75. Further, transmission timing circuit 72 receives a status signal 76 and a receive data writing timing signal 77, which is used to generate timing signals 78, 79. Data reception start signal 74 can, for example, be generated in response to start delimiter SD of frame 21, or in some other way which indicates data frame reception is to begin. Similarly, data frame reception end signal 73 can be generated from an end delimiter, if present. Signal 73 can also be generated based on a difference detected in signals in different data frames, e.g., in response to receipt of a preamble of the next data frame received. Timing signals 77, 78, 79 are typically generated in response to other known timed events, e.g., the receipt of data, $Data_0 \ldots Data_n$. These timing signals may or may not be related to each other.

An information word number WN is output from the receive and transmission control circuit 75 to a buffer memory bus 41. Counter 80 latches WN in accordance with the timing signal 78 from the transmission timing circuit 72. Register 81 latches a start memory address ADRS in accordance with the timing signal 79. Using timing signal 100, NEXT-PTR 82 latches a top address of a memory block storing received data read out from the start memory address ADRS of the address conversion memory circuit 71. The BF-PTR 84 latches a top address of an empty memory block.

Figure 8:
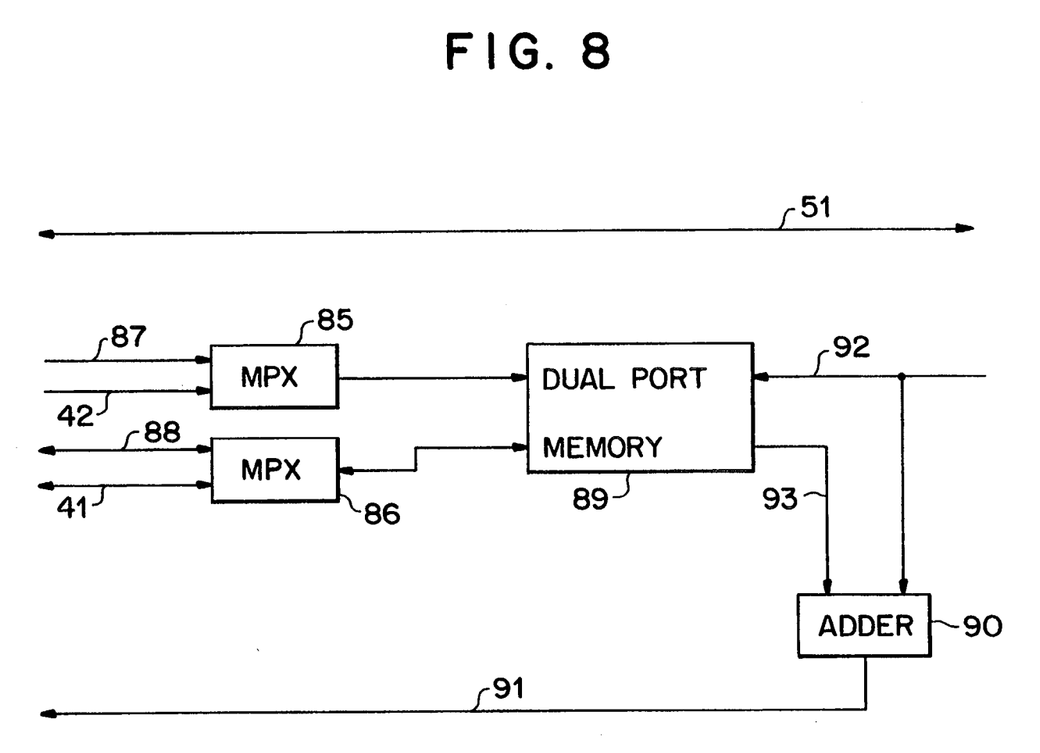
FIG. 8 is a block diagram illustrating the address conversion memory circuit shown in FIG. 6.

As shown in FIG. 8, the address conversion memory circuit 71 includes multiplexers 85, 86, dual port memory 89 and adder 90. Multiplexer 85 multiplexes data from address bus 42 of the buffer memory bus 40 and data from address bus 87 of receive data frame transmission control circuit 70. Multiplexer 86 multiplexes data from data bus 41 of the buffer memory bus 40 and data from data bus 88 of the receive data frame transmission control circuit 70. Adder 90 calculates a virtual common memory address 91 (for transmission on address bus 52') by adding host address bus input 92 and data on signal line 93 in the form of addresses of tops of memory blocks in the receive buffer 24 serving as the virtual common memory and which are read out from the dual port memory 89. At system initialization, the dual port memory 89 is download from another device with address conversion data that associates a start address ADRS with a block in the receive buffer 24 acting as a virtual common memory.

The data 93, which is stored in and output from dual port memory 89 in address conversion memory circuit 71, indicates a top address of a memory block in the receive buffer 24 storing received data corresponding to the host address bus input 92. Therefore, a separate common memory is not necessary.

Figure 10:
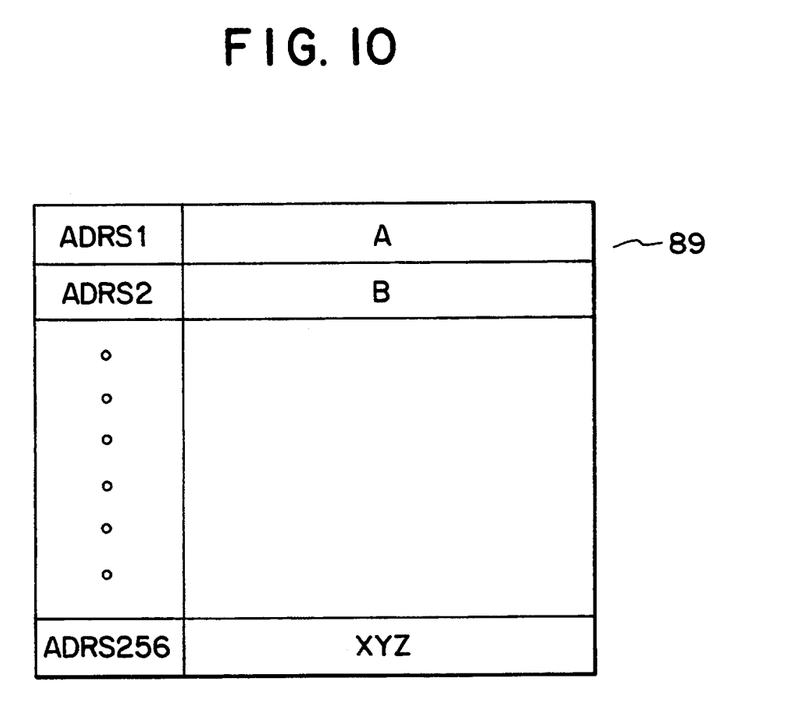
FIG. 10 illustrates the contents of a dual port memory in an address conversion circuit.

Upon initialization of a node, dual port memory 89 is downloaded with a list of addresses in the receive buffer, which correspond to the top addresses of the various empty blocks. Each address in the dual port memory corresponds to a unique start address ADRS. Thus, for example, as shown in FIG. 10, the dual port memory can be downloaded with 256 top addresses (A through XYZ) of empty blocks in the receive buffer with each address corresponding to a start address ADRS 1 through ADRS 256. Loading of the dual port memory is accomplished through address bus 42 and data bus 41 by means of receive and transmission control processor 25. This information is transmitted to address conversion memory circuit 71, as shown in FIG. 7 through multiplexers 85 and 86 to dual port memory 89 as shown in FIG. 8.

The addresses of the receive buffer 24 corresponding to the top addresses of the memory blocks which form the virtual common memory are transferred to dual port memory 89 in the address conversion memory circuit 71 via data bus 41. An initial top address value is also loaded into buffer pointer BF-PTR 84 by the receive and transmission control processor 25.

Under normal circumstances when data input via frame 21 is to be written to the virtual common memory of the receive buffer 24, start address data ADRS is loaded from bus 41 into register 81 and then used via signal line 87 and multiplexer 85 to address dual port memory 89. The output of dual port 89 for the particular start address ADRS is provided along signal lines 88 and 83 to next pointer NEXT-PTR 82. Thus, next pointer 82 contains the location in the receive buffer where the current information corresponding to the start address ADRS of this frame has been written. This information, in NEXT-PTR 82, is transferred via signal line 95 to buffer pointer 84 at the end of the frame receiving stage. However, before the contents of BF-PTR 84 is replaced with the contents of the next pointer NEXT-PTR 82, the information currently in buffer pointer BF-PTR 84 is written into the dual port memory 89 at the address corresponding to the received ADRS of the frame. As a result, the contents stored in the dual port memory 89 at the address ADRS specified by the received frame is updated to a new value. This new value is the contents of buffer pointer BF-PTR 84, which is the same address data that buffer pointer BF-PTR 84 previously received from the next pointer NEXT-PTR 82.

Typically, each start address ADRS is encountered in sequence to avoid writing over the information in the receive buffer portion acting as a virtual common memory before the information is accessed by the host device 29. Assuming 256 separate start addresses with corresponding receiving buffer top of block entries are stored in dual port memory 89, after 256 accesses, the system will recycle to ADRS 1.

Figure 9:
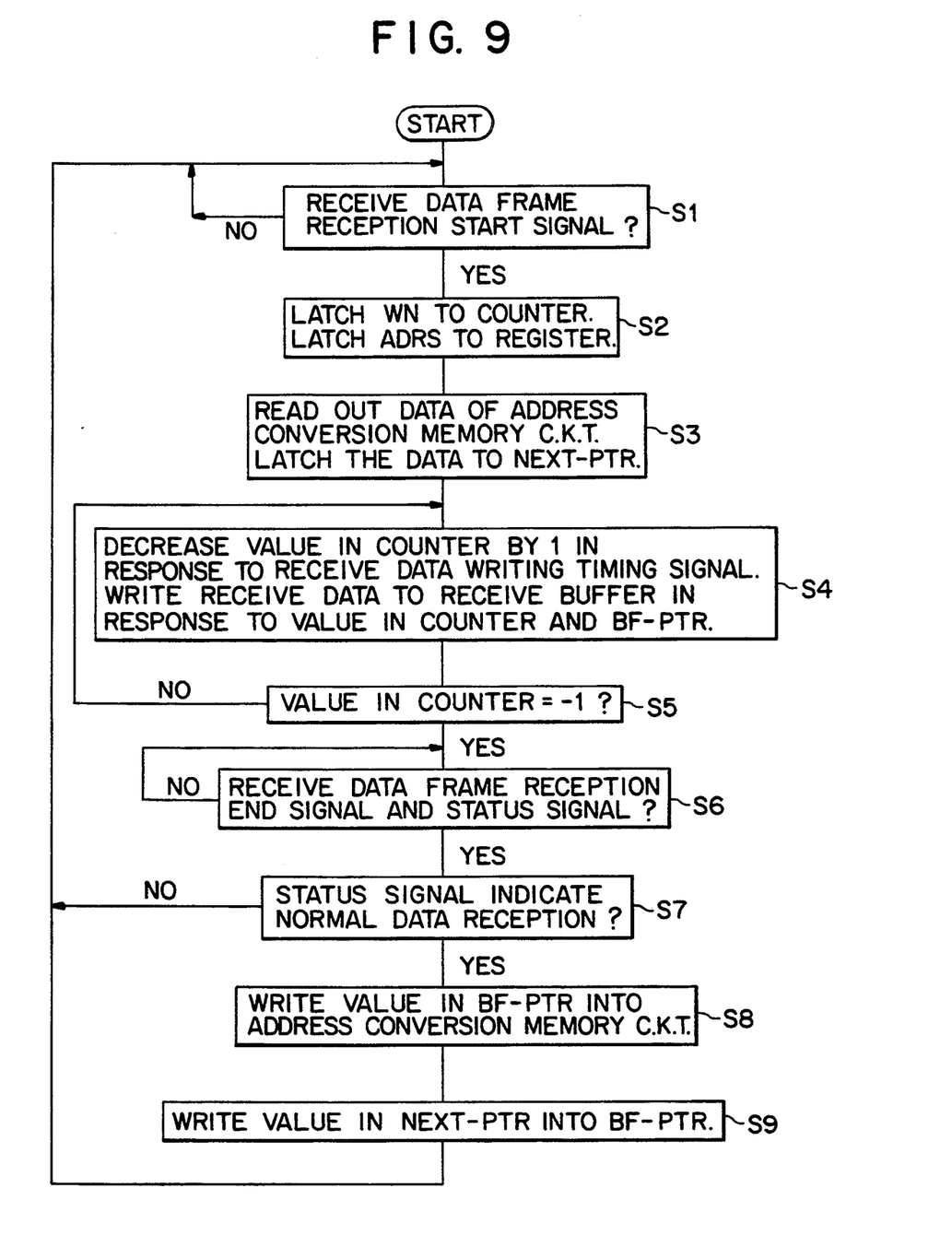
FIG. 9 is a flowchart showing procedures for processing received data.

The chain of operations of the embodiment is described with reference to FIG. 9. In step S1 of FIG. 9 it is determined if the receive data frame reception start signal is received. Before this can occur, a data frame having the format shown in FIG. 2 must be received by a transceiver circuit 20 of another node. The received data frame 21 from the transceiver circuit 20 is routed to the receive and transmission control circuit 75. Receive and transmission control circuit 75 checks the DA field in the received data frame 21 to determine whether or not the received data frame 21 is intended for that node. This includes checking if a broadcast address or a multicasting address in the DA field of received data frame 21 designates that node as an addressee. Circuit 75 then processes the data frame 21 if appropriate. The received data in the fields from the FC field to the FCS field, which is to be stored at a storage location in receive buffer 24, is output by the receive and transmission control circuit 75 to the buffer memory bus 40 with the data frame reception start signal 74 in accordance with the receive data writing timing signal 77. Transmission timing circuit 72 detects the data frame reception start signal 74, as shown in step S1 of FIG. 9.

In step S2, the information word number WN and the start memory address ADRS are latched by counter 80 and register S1, respectively, each in accordance with the timing signals 78, 79. In step S3, the address conversion memory circuit 71 is accessed.

Multiplexer 85 is set to address dual port memory 89 at the memory start address ADRS latched into register 81 and transmitted on address bus 87. Multiplexer 86 is set to output the result of this access to buffer memory address bus 88, which is latched into NEXT-PTR 82 through signal line 83 according to timing signal 100. As a result, NEXT-PTR 82 holds a top address of a memory block storing the received data read out from the start memory address ADRS. BF-PTR 84 then receives the value 95 latched into NEXT-PTR 82 and stores its value as the new top address of the empty block in the receive buffer 24.

In step S4 the value WN in the counter 80 is decreased by 1 each time the receive data writing timing signal 77 is input by the transmission timing circuit 72. The storage address is designated in the receive buffer 24 with a high portion and a low portion. Receive buffer 24 regards the value in the buffer pointer, BF-PTR 84 (which is the top address of the empty block), as the high portion of the address and the value in the counter 80 as the low portion of the address. The received data are then written in the receive buffer 24 at the designated address.

In step S5, the above procedure is repeated until the value in the counter 80 decreases to −1. In step S6, when the value of the counter 80 is −1, the data frame reception end signal 73 from the receive and transmission control circuit 75 and the input status signal 76, which indicates whether or not the data reception is completed without error, are input. In step S7, input status signal 76 is checked to determine whether it indicates normal or abnormal data reception.

When the input status signal 76 indicates abnormal data reception, the procedure is interrupted and the flow moves to step S1. When the input status signal 76 indicates normal data reception, in step S8 the value 94 in the buffer pointer, BF-PTR 84, is written into an address conversion memory address of dual port memory 89 of the address conversion memory circuit 71 by setting multiplexer 86 to read data on data bus 88. In step S9, the value 95 in the NEXT-PTR 82 is rewritten in the buffer pointer, BF-PTR 84. The above processing is then repeated for each received data frame.

In FIG. 6 when the host equipment 29 reads out the data from virtual common memory, that is the receive buffer 24, the host equipment 29 transmits a common memory address to be read out to the address conversion memory circuit 71 through the interface circuit 28. As shown in FIG. 8, the common memory address from the host equipment 29 is routed to the host address bus input 92, and the data 93 in the dual port memory 89 is read out. The data 93 read from dual port memory 93 is the top address of a block in receive buffer 24, which is the virtual common memory.

The address in the virtual common memory is produced as the sum of host address bus input 92 and the read data 93 by adder 90. It is necessary to add the host address bus input 92 to the data 93 read from dual port memory 89 because the top address held in the dual port memory 89 is only the value of the high portion of an address in receive buffer 24. This typically corresponds to a multiple of the block capacity. By adding the top address to the host address bus input 92, the address conversion memory circuit 71 converts a common memory address, which the host equipment 29 tries to read out, into the memory address in the receive buffer 24, which stores the received data, so it is accessed.

As processed above, data is read out from a virtual common memory (receive buffer 24) using a memory address common to the whole system or network. It is therefore possible to use the received data in each of the nodes without transmitting from the receive buffer 24 to a physical common memory. The host equipment 29 can access data in common memory or virtual common memory the same way.

Since the time for processing the received data can be shortened, data transmission in the whole system can be executed at higher speeds. In particular, this is useful in processing continuously received data.

Further it is possible to store the output data from each of the nodes with certainty and to always store the correct data in the receive buffer. It is possible to designate the common memory address by the host equipment and to read out the necessary data exactly. Since the translation from common memory addresses used by the host equipment to virtual common memory addresses can be made within a node, it is not necessary to modify the addressing scheme employed by the host equipment.

Although the foregoing description has been given with reference to a ring type network, the present invention is not restricted to this particular type of network. For instance, this invention may be applied to a bus type network, star type network and other network types, as well, within the scope and spirit of the invention. The common transmission medium L is not limited to an electric type, but may also be of an optical or radio type.

As described above, according to the invention, the time for processing the received data can be shortened and the data transmission in the whole system can be executed at higher speed. Consequently reliability of the data transmission system can be improved.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data transmission system comprising:
    a plurality of nodes connected to a common transmission medium, the nodes periodically transmitting, receiving and storing data, wherein data received at one of the nodes is read out using a specific address common among the plurality of nodes for information exchange, each node further comprising:
    a transceiver connected to the common transmission medium, the transceiver receiving a data frame and transmitting the data frame;
    receive and transmission control means, the receive and transmission control means receiving the data frame, detecting whether the data frame designates said node and thereafter transmitting a data frame reception start signal and a data frame reception end signal;
    received data frame transmission control means, the received data frame transmission control means extracting received data included in the received data frame in response to the data frame reception start signal, and transmitting the received data in response to the data frame reception end signal;
    a receive buffer, receiving and storing the received data;
    an interface providing the specific address;
    an address conversion memory means, the address conversion memory means storing an address of the received data in the receive buffer and generating a conversion address in order to convert the specific address from the interface into the address of the received data and access the received data.

2. A data transmission system according to claim 1, wherein:
    the receive buffer has multiple blocks divided in accordance with the number of data included in the data frame, the number of the blocks being at least one more than a total number of data frames to be received,
    the receive and transmission control means transmits a normal data frame reception end signal indicating the data frame is received normally and an abnormal data frame reception end signal indicating the data frame is received abnormally,
    the received data frame transmission control means has means for transmitting received data to an empty one of the blocks in the receive buffer as a received data frame is detected to be a data frame in response to a data frame reception start signal of the data frame, and
    the receive and transmission control means further rewrites an address in the receive buffer, thereby storing received data corresponding to the specific address in the address conversion memory to an address in a block in the receive buffer in order to regard the block as new received data for the external interface in response to the normal data frame reception end signal.

3. The apparatus recited in claim 2, wherein, in response to receipt of the abnormal data frame reception end signal, the contents of the address conversion memory is prevented from renewing and the block is renewed in order to write next received data.

4. The apparatus recited in claim 1, wherein said address conversion memory means comprises:
    a dual port memory, the dual port memory storing top addresses of memory blocks in the receive buffer; and
    an adder having a first input receiving the specific address from the interface, a second input from the dual port memory and an output, the output being the conversion address to access the received data.

5. The apparatus recited in claim 1, wherein the receive and transmission control means comprises means for determining whether the data frame is received without errors.

6. The apparatus recited in claim 1 wherein the address conversion memory means comprises a memory initialized with the addresses of the receive buffer where the received data is received.

7. A method of data transmission among interconnected nodes, the method comprising the steps of:

receiving at one of the nodes a data frame transmitted on a transmission medium;

detecting whether said data frame designates said node and thereafter transmitting a data frame reception start signal and data frame reception end signal;

extracting received data in said data frame in response to said data frame reception start signal and transmitting the received data;

receiving and storing the received data at an address in a receive buffer;

receiving into an external interface from host equipment a specific address;

storing the address of the received data in the receive buffer in an address conversion memory and generating a conversion address to convert the specific address received by the external interface into the address of the received data.

8. The method recited in claim 7, further comprising the steps of:

storing in a dual port memory top addresses of memory blocks in the receive buffer; and adding the specific address to the top address corresponding to one of the blocks in the dual port memory, thereby generating the conversion address to access data in the receive buffer.

9. The method recited in claim 8 further comprising the step of downloading top addresses into the dual port memory at an initialization time.

10. The method recited in claim 8 further comprising the step of detecting whether the data frame is received without errors.

* * * * *